3,394,887
REAR SEAT HEATER
Robert J. Megargle, Grosse Pointe Park, Oscar W. Abel, Royal Oak, and Harry Urbanek and Alphonse Singer, Detroit, Mich., assignors to Chrysler Corporation, Highland Park, Mich., a corporation of Delaware
Filed Aug. 3, 1965, Ser. No. 476,805
12 Claims. (Cl. 237—12.3)

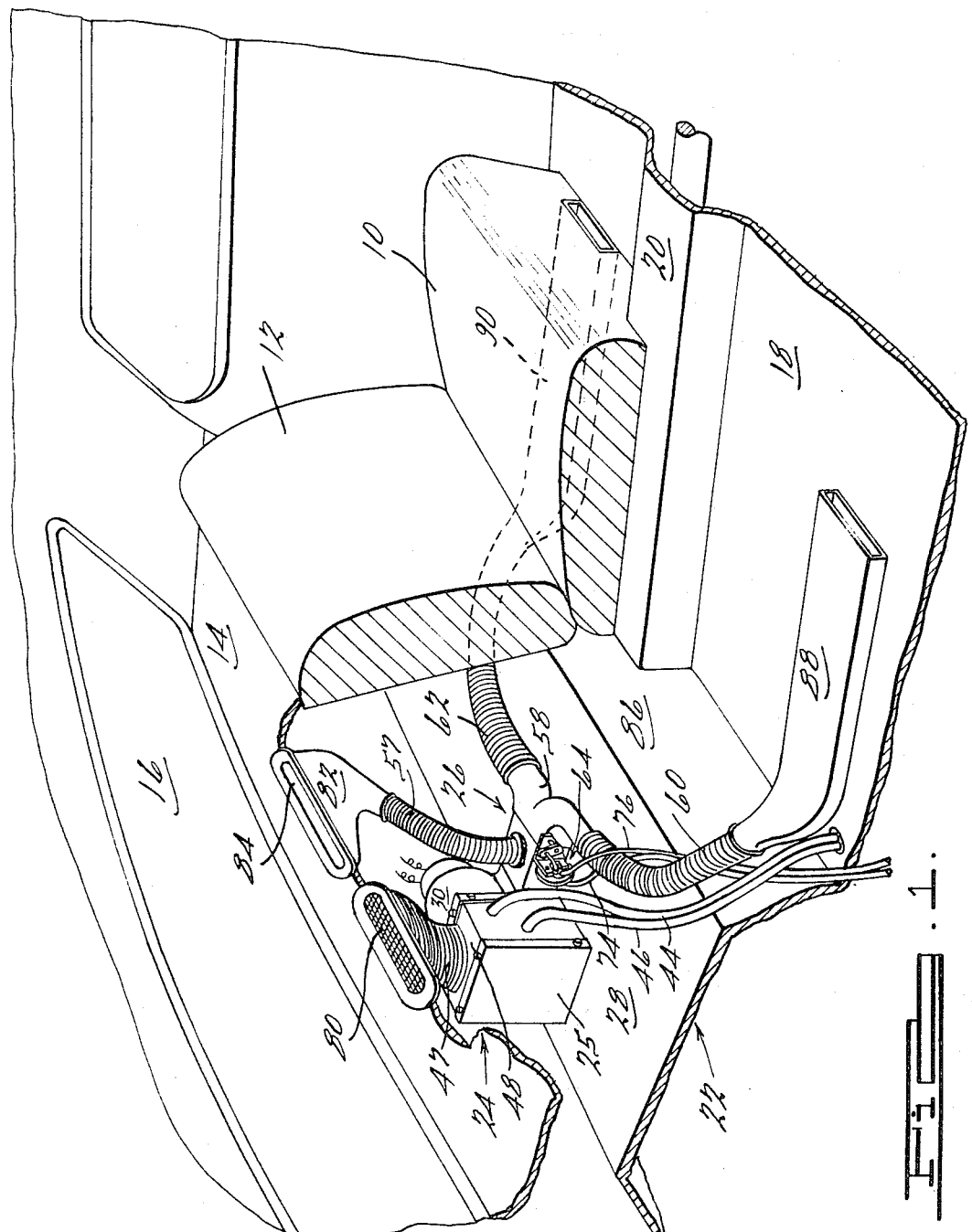

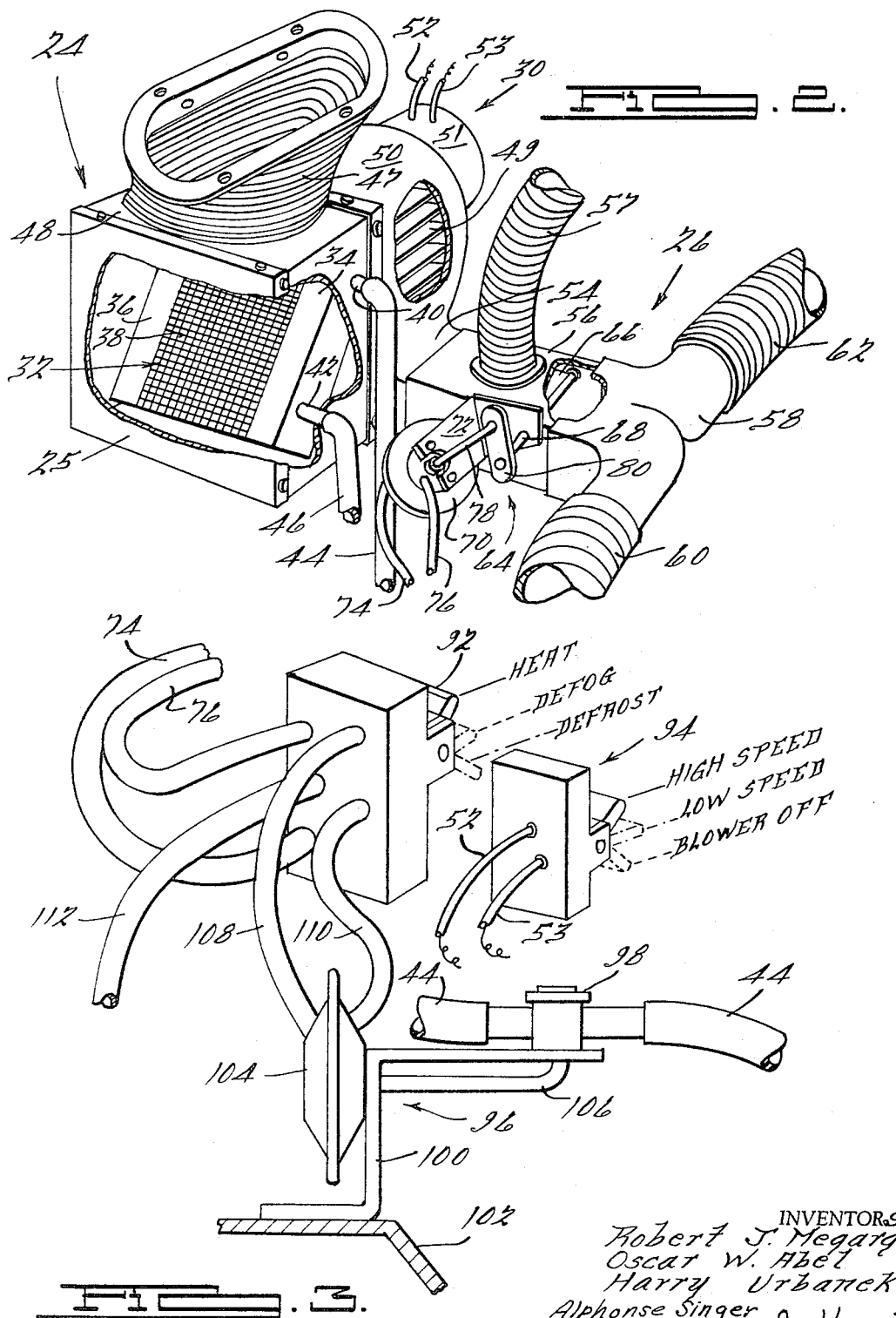

ABSTRACT OF THE DISCLOSURE

A rear seat heater unit for a motor vehicle including a radiator-type heat exchaanger positioned on the kick-up behind the back of the rear seat; a conduit extends from the discharge of the heat exchanger upwardly to the package shelf, whereby to direct heated air against the back window, and another conduit extends forwardly beneath the seat cushion, whereby to discharge air into the rear passenger compartment. The inlet air for the heat exchanger is sucked in through a conduit opening at a grill positioned in the package shelf.

---

This invention relates to a rear set heater for a motor vehicle.

It is an object of the present invention to provide an improved rear seat heater for a motor vehicle.

Another object is to provide a rear seat heater which also includes provision for defrosting the back window of the motor vehicle.

Another object is to provide a rear seat heater and/or defroster assembly of simple, inexpensive, and improved construction.

According to the invention, a separate heater unit is provided for the rear passenger compartment; a first air conduit extends from the heater unit and opens at a location substantially beneath the back window of the motor vehicle, whereby heated air may be delivered to the back window to defrost the same, and a second air conduit extends from the heater unit and opens at a central location within the rear passenger compartment, whereby heated air may be delivered to the rear passenger compartment to heat the same.

According to another feature of the invention, the heater unit is mounted behind the seat back of the rear seat on the kickup over the rear axle assembly. The first, or defrost air conduit extends upwardly from the heater unit and opens at the package shelf behind the rear seat, whereby heated air may be delivered directly against the inside surface of the rear window. The second, or heater air conduit extends forwardly from the heater unit and passes beneath the seat bottom of the rear seat. The heater air is discharged into the rear passenger compartment at floor level adjacent the forward edge of the seat bottom.

Means are also provided to enable the operator of the motor vehicle to selectively direct the air output of the heater unit through the defrost conduit or through the heater conduit. Means are also provided to enable the heater assembly to deliver unheated air to the rear window, as for example when a defogging rather than a defrosting action is required.

These and other objects, features and advantages of the invention will be apparent from the following detailed description of a preferred embodiment of the invention and from the accompanying drawing wherein:

FIG. 1 is a fragmentary perspective view showing a rear seat heater and defroster assembly installed behind the rear seat of a motor vehicle;

FIG. 2 is a fragmentary perspective view, on an enlarged scale, of the heater and defroster assembly of FIG. 1; and FIG. 3 is a partially schematic view of the control system for the heater and defroster assembly of FIGS. 1 and 2.

The motor vehicle of FIG. 1 is of conventional form and includes a rear seat bottom 10, a rear seat back 12, a package shelf 14, a rear window 16, a floor 18 including a drive shaft tunnel 20, and a kick up 22 elevated above the level of the floor 18 to clear the rear axle assembly (not shown) of the vehicle. It will be understood that the vehicle also includes a front passenger seat spaced forwardly of rear seat 10, 12.

A rear seat heater and defroster assembly is positioned generally behind seat back 12. The heater and defroster assembly includes a heat generating assembly 24 and a heat distributing assembly 26 positioned to receive the output of generating assembly 24 and selectively distribute it to the vehicle interior.

Heat generating assembly 24 includes a casing 25 supported on top wall or floor 28 of kickup 22 and a centrifugal blower 30 positioned against a vertical wall of casing 25 and communicating with the casing interior.

Referring now to FIG. 2, a radiator unit 32 of known construction is positioned diagonally within casing 25. Unit 32 includes side tanks 34 and 36, a central core 38 and water inlet and water outlet fittings 40, 42 projecting laterally from tank 34 and passing through the adjacent side wall of casing 25 for connection to water inlet and water outlet hoses 44, 46. Water inlet hose 44 receives hot water from the engine cooling system and water outlet hose 46 returns the cooled water to the engine cooling system. A large diameter flexible hose 47 communicates at its lower end with the interior of casing 25 through a suitable aperture in the top wall 48 of the latter.

Blower 30 includes a blower wheel 49 mounted for rotation within a scroll 50 and driven by a blower motor 51 receiving power from electric leads 52, 53. When blower wheel 49 is rotated, air is sucked into casing 25 through hose 47, whereafter it passes diagonally downwardly through core 38 for discharge through the tangential outlet spout 54 of scroll 50.

Heat distributing assembly 26 includes a generally rectangular duct 56 aligned with spout 54 to receive the air discharge of the blower, a flexible hose 57 communicating at its lower end with the interior of duct 56 through a suitable aperture in the top wall of the latter, a T or header duct 58 positioned to centrally receive the discharge of duct 56 and distribute it to flexible hoses 60, 62 fitted over the respective duct ends, and valve means indicated generally at 64 to selectively control the distribution of discharge air from the blower.

Valve means 64 includes a door or flap 66, a shaft 68 integral with door 66 and journaled in the side walls of duct 56 adjacent the discharge end of the latter, a double acting vacuum actuator 70 of known form supported by an angle bracket 72 secured to a side wall of duct 56, vacuum hoses 74, 76 communicating with the opposite chambers of actuator 70 to selectively apply a vacuum across the actuator diaphragm to axially reciprocate actuator piston rod 78, and a crank 80 keyed at one end to the free end of shaft 68 and pivotally secured at its other end to the free end of piston rod 78. Axial movement of piston rod 78 will be seen to pivot door 66 between its illustrated generally horizontal position, in which it allows free flow from duct 56 into header duct 58 and substantially blocks communication between duct 56 and hose 57, and a downwardly inclined position in which it allows free flow between duct 56 and hose 57 and substantially blocks communication between duct 56 and header 58.

Referring again to FIG. 1, the upper end of hose 47 opens at an air inlet grille 80 set in package shelf 14. The upper end of hose 57 connects to the lower end of a duct 82 which in turn opens at its elongated upper end in a slot grille 84 set in package shelf 14 beside grille 80. Hose 60 extends from header duct 58 in a righthand direction along kickup top wall 28 and then runs downwardly along the inclined kickup forward wall 86 for connection to a duct 88. Duct 88 extends along floor 18 and beneath seat bottom 10 and opens at its free end at the right front face of seat bottom 10 adjacent floor 18. Hose 62 runs in a lefthand direction along kickup top wall 28 and then runs downwardly along kickup forward wall 86 for connection to a duct 90 opening at the left front face of seat bottom 10.

From the description thus far it will be apparent that, with hot water flowing through radiator unit 32 and blower wheel 49 spinning, passenger compartment air will be drawn in through package shelf grille 80 and will be heated for distribution to the car interior. With door 66 in its illustrated horizontal or "heat" position, the heated air will be delivered to the rear passenger compartment through ducts 88, 90. With door 66 in its previously described downwardly inclined or "defrost-defog" position, the heated air will be directed through slot grille 84 against rear window 16 to defrost the latter.

Reference is now made to FIG. 3 wherein the control system for the rear seat heater and defroster assembly is schematically illustrated. The control system, broadly considered, comprises a vacuum switch 92 positioned on the instrument panel of the motor vehicle, a blower switch 94 similarly positioned, and a water valve assembly 96.

Blower switch 94 receives blower motor leads 52, 53 so that manipulation of switch lever 94 turns blower 30 off and on.

Water valve assembly 96 includes a water valve 98 and a double acting vacuum actuator 104. Water valve 98 is of known construction and is interposed in water inlet hose 44 and supported on a bracket 100 fixed, for example, to a front wheel housing 102 of the vehicle. Actuator 104 is of known construction and is supported on bracket 100 with its piston rod 106 extending through that bracket for connection to valve 98. Vacuum hoses 108, 110 communicate with the opposite chambers of actuator 104 to selectively apply a vacuum across the actuator diaphragm to axially reciprocate piston 106 and thereby open and close valve 98.

Vacuum switch 92 is of known construction and includes five vacuum ports. One port connects to a vacuum hose 112 which is in turn connected to the intake manifold of the vehicle engine; two other ports connect to hoses 74, 76 controlling heater door actuator 70; and the remaining two ports connect to hoses 108, 110 controlling water valve actuator 104.

Switch 92 includes a switch lever 94 having three positions. With lever 94 in its first or "heat" position, intake manifold hose 112 is ported to hoses 110 and 74 and hoses 108 and 76 are vented to atmosphere. Porting of vacuum to hose 110 opens water valve 98 to deliver hot water through inlet hose 44 to radiator unit 32, and porting of vacuum to hose 74 moves door 66 to its illustrated horizontal or "heat" position. The heater and defroster assembly thus functions to deliver heated air to the rear passenger compartment through floor ducts 88, 90.

With lever 94 in its second or "defog" position, intake manifold hose 112 is ported to hoses 76 and 108 and hoses 110 and 74 are vented to atmosphere. Porting of vacuum to hose 108 closes water valve 98 to block the flow of hot water to the radiator unit and porting of vacuum to hose 74 moves door 66 to its downwardly inclined "defrost-defog" position. The heater and defroster assembly thus functions to direct air at ambient temperature through slot grille 84 and against rear window 16 to "defog" the same.

With lever 94 in its third or "defrost" position, intake manifold hose 112 is ported to hoses 76 and 110 and hoses 108 and 74 are vented to atmosphere. This opens water valve 98 and positions door 66 in its "defrost-defog" position so that heated air is now directed against rear window 16 to defrost the same.

It will of course be apparent that the amount of air delivered in any position of switch lever 94 may be selectively varied by movement of switch lever 94 between its illustrated "high speed" and "low speed" positions.

It will be seen that the invention provides a simple and compact unit capable of efficiently and selectively performing the three functions of heating the rear passenger compartment, defrosting the rear window, and defogging the rear window.

While a preferred embodiment of the invention has been illustrated and described in detail, it is to be understood that various changes may be made in the disclosed embodiment without departing from the scope or spirit of the invention as defined by the appended claims.

We claim:
1. A motor vehicle comprising
  (A) a front passenger seat;
  (B) an engine positioned forwardly of said front passenger seat;
  (C) means defining a rear passenger compartment behind said front seat;
  (D) a forwardly facing rear passenger seat disposed in said rear passenger compartment and including
    (1) a seat back and
    (2) a seat bottom;
  (E) a heat generating assembly including a casing, an air intake on said casing for receipt of incoming air, a heater unit positioned within said casing to heat said incoming air, and an air outlet on said casing for discharge of the air heated by said heater unit; and
  (F) an air conduit connected to said casing air outlet to receive heated air therefrom and extending forwardly beneath said seat bottom to open at the front face thereof to deliver heated air to said rear passenger compartment.

2. A motor vehicle according to claim 1 wherein said heater unit is disposed behind said seat back.

3. A motor vehicle comprising
  (A) a front passenger seat;
  (B) means defining a rear passenger compartment behind said front seat;
  (C) a forwardly facing rear passenger seat disposed in said rear passenger compartment and including
    (1) a seat back and
    (2) a seat bottom;
  (D) a back window disposed generally rearwardly of said rear seat;
  (E) a heater unit;
  (F) an air conduit connected to sai dheater unit and extending upwardly behind said seat back to open generally beneath said back window, whereby to deliver heated air to said window to defrost the same; and
  (G) another air conduit connected to said heater unit and extending forwardly beneath said seat bottom to open at the front face thereof, whereby to deliver heated air to said rear passenger compartment.

4. A motor vehicle comprising
  (A) a front passenger seat;
  (B) means defining a rear passenger compartment behind said front seat;
  (C) a forwardly facing rear passenger seat disposed in said rear passenger compartment and including
    (1) a seat back and
    (2) a seat bottom;
  (D) a back window disposed generally rearwardly of said rear passenger seat;

(E) a package shelf positioned behind said seat back and generally beneath said back window
(F) a heater unit disposed behind said seat back and beneath said package shelf and including an air intake and an air discharge;
(G) a first air conduit extending upwardly from the air intake of said heater unit and opening in said package shelf; whereby to provide a supply of air for said heater unit;
(H) a second air conduit extending upwardly from the air discharge of said heater unit and opening in said package shelf, whereby to deliver heated air to said back window to defrost the same; and
(I) a third air conduit extending forwardly from the discharge of said heater unit and passing beneath said seat bottom to open at the front face thereof, whereby to deliver heated air to said rear passenger compartment to heat the same.

5. A motor vehicle according to claim 4 wherein
(A) the vehicle body includes
   (1) a main floor portion, and
   (2) a rearward floor portion elevated above the level of said main floor portion to provide clearance for the rear axle assembly of the vehicle;
(B) said forwardly facing rear passenger seat includes
   (1) a seat bottom supported on said main floor portion and
   (2) a seat back extending upwardly from said seat bottom in front of and adjacent said rearward floor portion; and
(C) said heater unit is positioned behind said seat back on said rearward floor portion.

6. In a motorm vehicle of the type including a front passenger seat, a rear passenger compartment behind said front seat, a rear passenger seat disposed in said rear passenger compartment, and a package shelf behind said rear passenger seat:
(A) means for drawing air from said rear passenger compartment downwardly through said package shelf;
(B) means positioned beneath said package shelf operative to heat said air; and
(C) means for distributing said heated air to said rear passenger compartment.

7. A motor vehicle according to claim 6 wherein said distributing means passes the heated air forwardly beneath the seat bottom of said rear passenger seat for discharge into said rear passenger compartment at the front face of said seat bottom.

8. A motor vehicle according to claim 6 wherein said distributing means passes the heated air upwardly through said package shelf and against the back window of the vehicle to defrost the same.

9. A motor vehicle according to claim 8 and further including
(A) means to render said heat means inoperative to heat said indrawn air, whereby said passing means may direct unheated air against said back window to defog the same.

10. A motor vehicle according to claim 6 wherein said distributing means are operative to selectively pass the heated air
(A) upwardly through said package shelf and against the back window of the vehicle to defrost the same, or
(B) forwardly beneath the seat bottom of said rear passenger seat for discharge into said rear passenger compartment at the front face of said seat bottom.

11. A heater assembly for use with a motor vehicle of the type including a water cooled front engine, front and rear passenger seats, and a package shelf positioned rearwardly of the rear passenger seat, said heater assembly comprising:
(A) a casing adapted to be positioned behind the rear passenger seat beneath the package shelf;
(B) a water radiator positioned within said casing and having fittings for connection to the water cooling system of the engine;
(C) a first air conduit communicating at one end with said casing at one side of said radiator and adapted to be extended upwardly therefrom to open at its upper end in the package shelf;
(D) a second air conduit communicating at one end with said casing at the other side of said radiator and adapted to be extended upwardly therefrom to open at its other end in said package shelf; and
(E) a third air conduit communicating at one end with said casing at said other side of said radiator and adapted to be extended forwardly therefrom beneath the seat cushion of the rear seat to open at its other end adjacent the forward face of the seat cushion.

12. A motor vehicle comprising:
(A) a front passenger seat;
(B) an engine positioned forwardly of said front passenger seat;
(C) means defining a rear passenger compartment behind said front seat;
(D) a rear passenger seat disposed in said rear passenger compartment and including a seat back and a seat bottom;
(E) a heater unit positioned behind said seat back and having an intake and a discharge;
(F) first air conduit means opening at one end and said rear passenger compartment and communicating at its other end with said heater unit intake;
(G) second air conduit means communicating at one end with said heater unit discharge and extending forwardly therefrom beneath said seat bottom to open its other end in the front face of said seat bottom; and
(H) a blower arranged to draw rear passenger compartment air through said first conduit means to said heater unit and thereafter direct the heated air through said second conduit means to said rear passenger compartment to heat the same.

References Cited

UNITED STATES PATENTS

| | | | |
|---|---|---|---|
| 2,302,416 | 11/1942 | Brooks | 237—12.3 |
| 2,493,122 | 1/1950 | Emerich | 237—12.3 |
| 2,725,605 | 12/1955 | Haltenberger | 98—2 |
| 2,783,622 | 3/1957 | Bourassa | 237—12.3 X |
| 2,837,288 | 6/1958 | Owen et al. | 237—12.3 |
| 2,963,954 | 12/1960 | Baker | 98—2.4 |
| 3,096,938 | 7/1963 | Cole et al. | 237—12.3 |

FOREIGN PATENTS

| | | |
|---|---|---|
| 1,076,659 | 4/1954 | France. |
| 846,157 | 8/1960 | Great Britain. |

EDWARD J. MICHAEL, *Primary Examiner.*